United States Patent
Sasaki et al.

(10) Patent No.: US 8,297,304 B2
(45) Date of Patent: Oct. 30, 2012

(54) STORAGE CONTAINER FOR LIQUID CHLOROSILANE AND CLOSING LID THEREFOR

(75) Inventors: Go Sasaki, Yokkaichi (JP); Takanori Ito, Ichinomiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 739 days.

(21) Appl. No.: 12/462,946

(22) Filed: Aug. 11, 2009

(65) Prior Publication Data

US 2010/0038362 A1   Feb. 18, 2010

(30) Foreign Application Priority Data

Aug. 13, 2008   (JP) .................... 2008-208320

(51) Int. Cl.
 *F16J 13/02*   (2006.01)
 *F17C 3/12*   (2006.01)
(52) U.S. Cl. ......... 137/271; 137/237; 137/269; 166/319
(58) Field of Classification Search ............ 137/237, 137/269, 240, 271; 251/175, 157, 187, 188; 220/88.3
See application file for complete search history.

(56) References Cited

U.S. PATENT DOCUMENTS

| | | | |
|---|---|---|---|
| 4,462,568 A * | 7/1984 | Taylor et al. ............... | 251/335.2 |
| 4,738,356 A * | 4/1988 | Gunkel et al. ............. | 206/524.3 |
| 4,979,643 A | 12/1990 | Lipisko et al. | |
| 5,086,804 A * | 2/1992 | Ngai ........................... | 137/312 |
| 5,102,010 A * | 4/1992 | Osgar et al. ................ | 222/1 |
| 5,279,338 A | 1/1994 | Goossens | |
| 6,615,851 B2 * | 9/2003 | Scholz ........................ | 134/104.1 |
| 7,448,402 B2 | 11/2008 | Martrich et al. | |
| 2002/0162340 A1 | 11/2002 | Boucher | |
| 2002/0189709 A1 | 12/2002 | Noah et al. | |

FOREIGN PATENT DOCUMENTS

| | | |
|---|---|---|
| EP | 0719978 A2 | 7/1996 |
| JP | 05-231598 | 9/1993 |
| JP | 2008-116044 | 5/2008 |

OTHER PUBLICATIONS

European Search Report dated Nov. 26, 2009, issued on the corresponding European Patent Application No. 09 16 7580.1.

* cited by examiner

*Primary Examiner* — John K Fristoe, Jr.
*Assistant Examiner* — Angelisa Hicks
(74) *Attorney, Agent, or Firm* — Edwards Wildman Palmer LLP

(57) ABSTRACT

The storage container for a liquid chlorosilane of the present invention comprises, a tank which stores the liquid chlorosilane, a valve which is connected to the tank and to which an external pipe can be connected detachably, and a closing lid which seals the valve when the external pipe is detached from the valve. The valve comprises a housing and a valve body provided in the housing. The closing lid has a lid body having a sealing surface contacting the connecting surface of the connecting flange, a supply pipe which supplies an inert gas to a space between the closing lid and the valve body in the housing, a supply valve which opens or closes the supply pipe, a discharge pipe which discharges a gas in the space, and a discharge valve which opens or closes the discharge pipe.

3 Claims, 3 Drawing Sheets

STORAGE CONTAINER FOR LIQUID CHLOROSILANE AND CLOSING LID THEREFOR

BACKGROUND OF THE INVENTION

1. Field of the Invention

The present invention relates to a storage container for a liquid chlorosilane, and a closing lid for the storage container.

Priority is claimed on Japanese Patent Application No. 2008-208320, filed Aug. 13, 2008, the content of which is incorporated herein by reference.

2. Description of Related Art

Chlorosilanes, such as trichlorosilane or silicon tetrachloride, are used for semiconductors, such as polycrystalline silicon and epitaxial films on silicon wafers, and for the raw materials of optical fibers, and the like. Typically, chlorosilanes are filled into containers or cylinders in manufacturing factories, and are carried to and used in manufacturing factories of semiconductors, optical fibers, or the like. When the chlorosilanes react with moisture in the air or the like, corrosive gas and silica are generated. Since the corrosive gas and silica corrode facilities, thereby causing problems, such as causing deterioration of quality and clogging of pipes, chlorosilanes stored the container must be prevented from contacting air or moisture.

As proposals which prevent the chlorosilanes in a container from contacting air, for example, closing structures as described in Japanese Patent Unexamined Publication Nos. 5-231598 and 2008-116044 are conventionally adopted.

In a gas-filled container of Japanese Patent Unexamined Publication No. 5-231598, in order to prevent silane gas leaked when a valve is loosened from igniting spontaneously in air, contaminating a mouthpiece, or corroding the mouthpiece or a gas supply system, a cap which airtightly seals the mouthpiece is provided, and an adsorbent which adsorbs moisture and oxygen, or an adsorbent which adsorbs silane gas is provided in this cap. Japanese Patent Unexamined Publication No. 5-231598 describes that, since the atmosphere in the mouthpiece and the cap is replaced with an inert gas composed mainly of nitrogen gas or the like by this adsorbent, corrosion can be suppressed even if the silane gas leaks out.

A leak control device in which a leaked reactive gas can be collected by providing a containment enclosure so as to enclose a fluid flow part connected to an outlet opening of a container is described in Japanese Patent Unexamined Publication No. 2008-116044.

However, the techniques of Japanese Patent Unexamined Publication Nos. 5-231598 and 2008-116044 which have the prevention of gas leaks as their object cannot be applied to storage containers of liquid chlorosilanes.

For example, in the gas-filled container of Japanese Patent Unexamined Publication No. 5-231598, absorption cannot be made by an adsorbent when liquid chlorosilane is leaked. Further, an apparatus of Japanese Patent Unexamined Publication No. 2008-116044 is an effective means in regard to leaks in a pipe connecting portion, but is not an effective means when there are leaks caused by deterioration of sealing performance of a valve.

Particularly, when the chlorosilanes contact air, they react with the air, thereby generating rust on a valve or silica adhere to the valve which obstructs the operation of the valve. When the end of a valve is sealed by a closing lid, the air including moisture exists in the sealed space formed between the valve and the closing lid. Therefore, when the leak of the chlorosilanes is caused by deterioration of sealing performance of the valve, the inside of the valve is corroded by the reaction with the moisture.

The present invention was made in view of such a situation, and the object thereof is to provide a storage container for a liquid chlorosilane and a closing lid for the storage container which can maintain the soundness of a valve with simple structure and reliably prevent the generation of corrosive gas caused by the leaking of its contents.

SUMMARY OF THE INVENTION

The storage container for a liquid chlorosilane of the present invention for achieving the above object is a storage container for a liquid chlorosilane comprising, a tank which stores the liquid chlorosilane, a valve which is connected to the tank and to which an external pipe can be connected detachably, and a closing lid which seals the valve when the external pipe is detached from the valve. The valve comprises a housing and a valve body provided in the housing, the housing has a connecting flange having a connecting surface to be connected detachably to the external pipe. The closing lid has a lid body having a sealing surface contacting the connecting surface of the connecting flange, a supply pipe which supplies an inert gas to a space between the closing lid and the valve body in the housing, a supply valve which opens or closes the supply pipe, a discharge pipe which discharges a gas in the space, and a discharge valve which opens or closes the discharge pipe.

According to the present invention, since the space formed between the valve body of the valve and the closing lid can be filled with an inert gas which does not react with a liquid chlorosilane, generation of corrosive gas or silica can be prevented. Further, since this space can be given positive pressure relative to the inside of the storage container, the sealing performance of the valve can be enhanced and leaks from the valve can be prevented.

Further, the closing lid for a liquid chlorosilane storage container of the present invention is a closing lid for a liquid chlorosilane storage container connected detachably to a connecting flange of a valve fixed to a tank which stores the liquid chlorosilane. The closing lid comprises a lid body having a sealing surface contacting a connecting surface of the connecting flange, a supply pipe which supplies an inert gas to a space between the closing lid and a valve body of the valve, a supply valve which opens or closes the supply pipe, a discharge pipe which discharges a gas in the space, and a discharge valve which opens or closes the discharge pipe. The closing lid is fixed to the connecting flange to seal the space.

According to the storage container for a liquid chlorosilane and the closing lid for the storage container of the present invention, generation of corrosive gas or silica is suppressed. Thus, the deterioration of the sealing performance of the valve or leaks of a liquid chlorosilane, which is caused by the corrosion of the surrounding members of the valve, can be prevented, and the risk when the closing lid is detached can also be reduced.

DETAILED DESCRIPTION OF THE INVENTION

Figure 1:
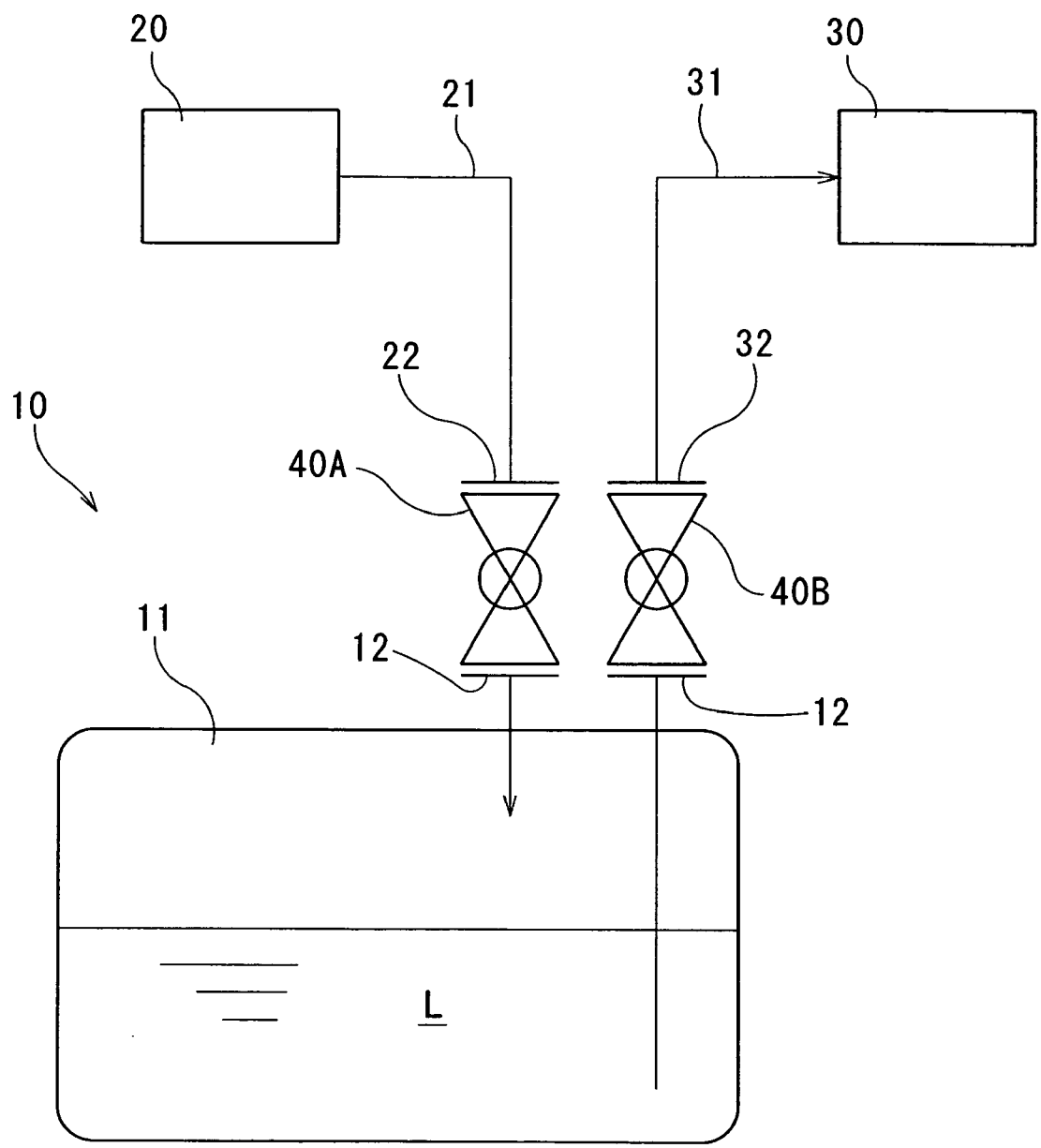
FIG. 1 is a schematic diagram showing one embodiment of a storage container for a liquid chlorosilane of the present invention.

Hereinafter, an embodiment of a storage container for a liquid chlorosilane according to the present invention will be described with reference to the drawings. A schematic diagram of a storage container 10 for a liquid chlorosilane L of the present invention, an inert gas supply tool 20 which supplies inert gas (for example, argon gas) to the storage container 10, and a container 30 which stores the liquid chlorosilane L extracted from the storage container 10 is shown in FIG. 1.

The storage container 10 includes a tank 11 and two valves 40A and 40B. Two valves 40A and 40B have a duct which allows the inside and outside of the tank 11 to be linked with each other, and open and close this duct. The valves 40A and 40B are so-called ball valves. One valve 40A is for the supplying of inert gas to the tank 11 and when the liquid chlorosilane L is extracted, an attaching flange 22 is connected to a connecting flange 42 (shown in FIG. 2.) of the valve. The attaching flange 22 is provided in a external pipe 21 which extends from the inert gas supply tool 20 which supplies inert gas (for example, argon gas). Further, the other valve 40B is for extracting the liquid chlorosilane L from the tank 11, and an attaching flange 32, included in a external pipe 31 which extends from an external container 30, is connected to a connecting flange 42 of the valve.

When the liquid chlorosilane L is extracted from the storage container 10, as shown in FIG. 1, inert gas is injected into the tank 11 from the inert gas supply tool 20 via the external pipe 21 and the ball valve 40A, whereby the liquid chlorosilane L is delivered from the tank 11 to the container 30 via the ball valve 40B and the external pipe 31. Then, the delivery of the liquid chlorosilane L is stopped by closing each of the ball valves 40A and 40B.

While the extraction of the liquid chlorosilane L is not being performed, the attaching flange 22 of the external pipe 21 and the attaching flange 32 of the external pipe 31 are detached from the connecting flanges 42 of both the ball valves 40A and 40B, and closing lids 60 which seal the ducts of the ball valves 40A and 40B are instead fixed to the connecting flanges 42. This can prevent the liquid chlorosilane L from leaking from the ball valves 40A and 40B even when extraction of liquid chlorosilane L is repeated.

Figure 2:
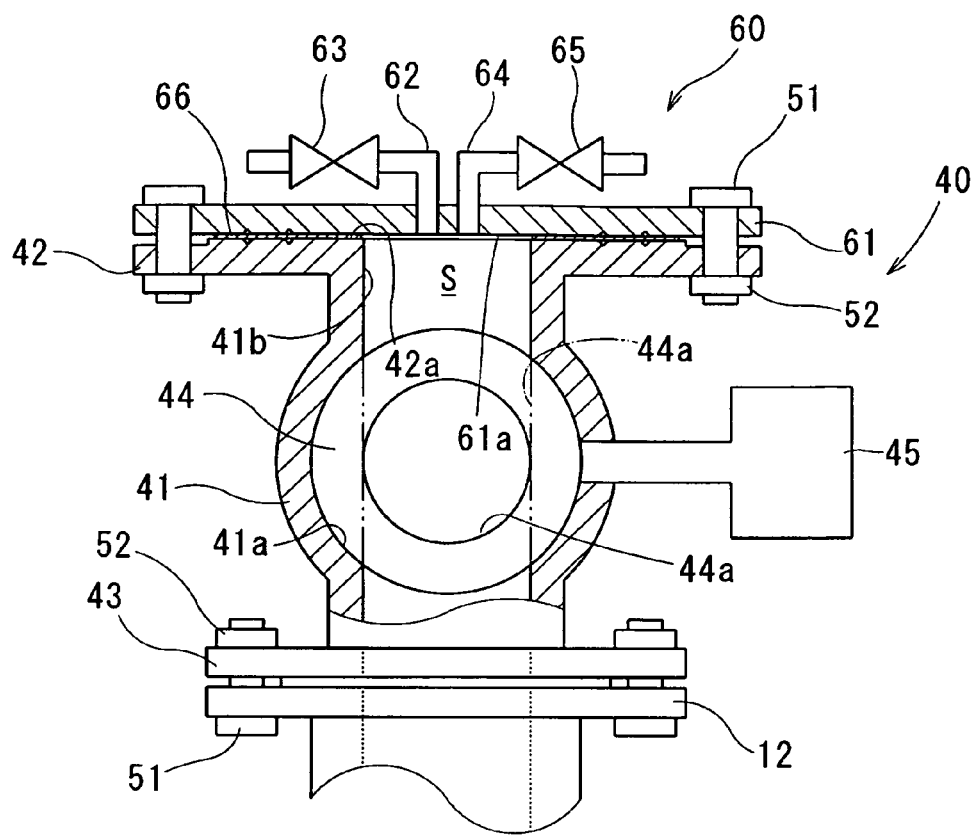
FIG. 2 is an enlarged sectional view of principal parts showing the vicinity of a ball valve in a state where a closing lid is mounted on the storage container shown in FIG. 1 is mounted.

The detailed structure of the ball valves 40A and 40B is shown in FIG. 2. In the following, the two ball valves 40A and 40B will be described by unifying the reference numerals thereof as 40 unless they are distinguished from each other.

The ball valve 40 includes a housing 41 which has the spherical valve seat 41a, connecting flanges 42 and 43 which are provided at both ends of the housing 41, a substantially spherical valve body 44 held rotatably at the valve seat 41a so as to open and close a duct 41b, and an operating portion 45 of the valve body 44. The ball valve 40 is attached to the tank 11 by fixing one connecting flange 43 to the fixed flange 12 on the side of the tank 11 by bolts 51 and nuts 52. Further, any one of the attaching flange 22 of the external pipe 21 which extends from the aforementioned inert gas supply tool 20, the attaching flange 32 of the external pipe 31 which extends from the external container 30, or the closing lid 60 is fixed to the other connecting flange 42 by bolts 51 and nuts 52.

In the ball valve 40, the valve body 44 is formed with a through hole 44a. As shown in FIG. 2, the duct 41b is shut off by disposing the through hole 44a in a direction orthogonal to the duct 41b of the valve 40, and the duct 41b is opened by rotating the operating portion 45 to make the through hole 44a coincide with the duct 41b of the valve 40 as shown by a chain line.

The closing lid 60 includes a lid body 61 which has a sealing surface 61a which contacts a connecting surface 42a via a gasket 66, a supply pipe 62 opened to the sealing surface 61a of the lid body 61 and a supply valve 63 provided in the supply pipe 62, and a discharge pipe 64 opened to the sealing surface 61a of the lid body 61 and a discharge valve 65 provided in the discharge pipe 64.

Figure 3:
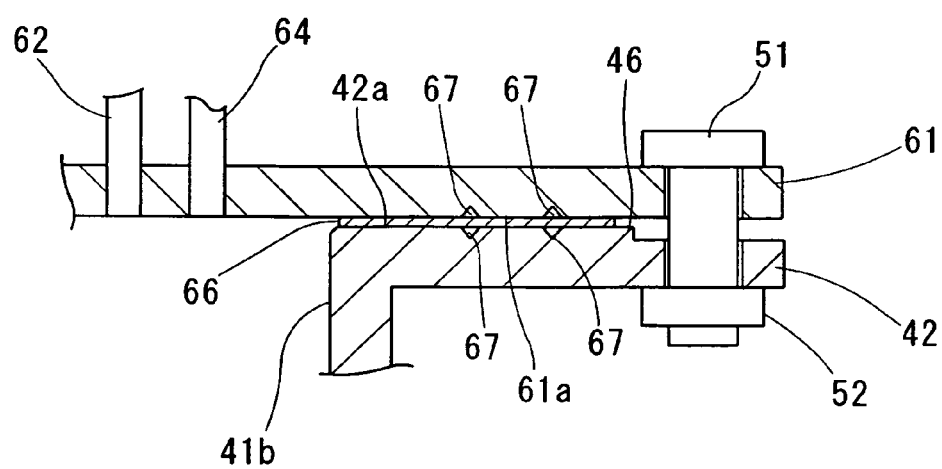
FIG. 3 is an enlarged view showing the vicinity of a joining portion between a connecting flange and a lid body of the closing lid shown in FIG. 2.

Further, as shown in FIG. 3, a protruding portion 46 is integrally provided at a central portion of an end surface of the connecting flange 42 of the ball valve 40 in the shape of a circular ring plate so as to surround the duct 41b. A tip surface of the protruding portion 46 is formed as the connecting surface 42a, and the sealing surface 61a of the lid body 61 in the closing lid 60 is connected to the connecting surface 42a via the gasket 66 made of tetrafluoroethylene or the like. In this state, the lid body 61 and the connecting flange 42 are fixed together by the bolts 51 and the nuts 52. Further, in the shown example, two ring grooves 67 having V-shaped cross-section are formed respectively in the connecting surface 42a of the protruding portion 46 in the connecting flange 42, and in the sealing surface 61a of the lid body 61 so as to face each other via the gasket 66. The ring grooves 67 are adapted to make the gasket 66 bite into the corner portions of the ring grooves 67 by the pressure caused by the fastening, thereby securing surface pressure to prevent oozing, and are adapted to be able to secure the prevention of the positional deviation of the gasket 66 between the above surfaces to improve sealing performance to reliably prevent oozing to the outside, when the chlorosilane is oozed out of the sealing surface 61a of the lid body 61, the connecting surface 42a of the connecting flanges 42 and the surfaces of the gasket 66.

In this sealed state, a space S sealed between the valve body 44 and the lid body 61 is formed in the duct 41b inside the ball valve 40.

Inert gas, such as argon gas, can be injected into this space S via the supply pipe 62 and the supply valve 63 of the closing lid 60, and the gas in the space S can be discharged via the discharge pipe 64 and the discharge valve 65. Since this can bring the inside of the space S into an inert atmosphere, a reaction with the moisture in the air accompanying the remaining liquid chlorosilane L in the space S can be prevented. Therefore, generation of corrosive gas and of silica (example: $SiHCl_3 + 2H_2O \rightarrow SiO_2 + H_2 + 3HCl$) can be prevented. In addition, the discharge gas from the space S can be subjected to detoxification processing by connecting a detoxifying tool, such as a scrubber, to the discharge pipe 64.

Figure 4A:
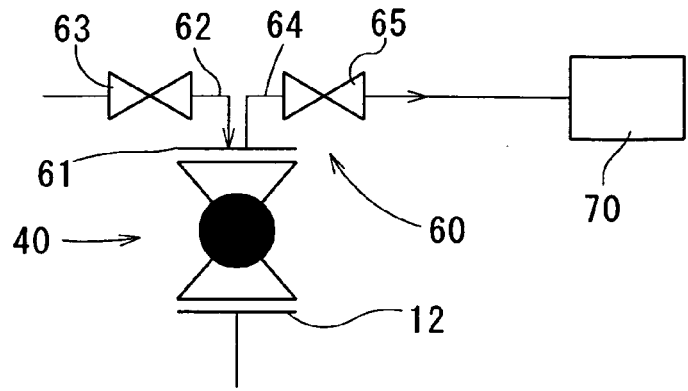
FIGS. 4A to 4C is schematic diagrams showing the procedure when the ball valve shown in FIG. 2 is closed.
Figure 4B:
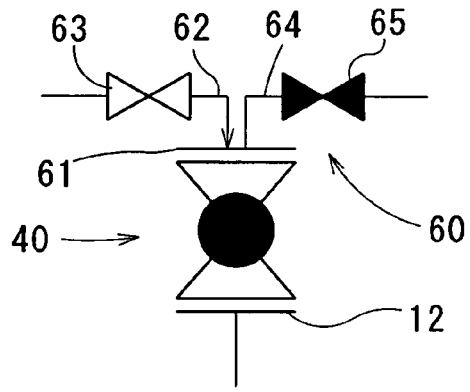
Figure 4C:
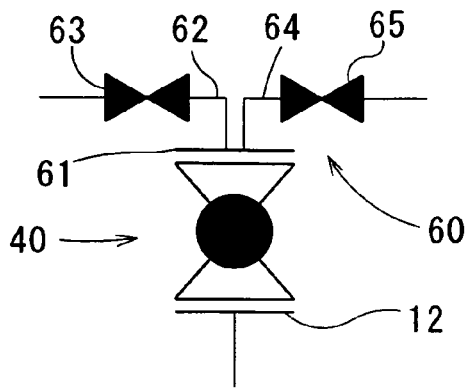

This will be concretely described referring to FIGS. 4A to 4C. In FIGS. 4A to 4C, as for the respective valves 40, 63, and 65, a blacked state is shown as a sealed state, and an outlined state is shown as an opened state. First, as shown in FIG. 4A, the supply valve 63 and the discharge valve 65 are opened with the ball valve 40 sealed, and inert gas is injected into the space S through the supply pipe 62. Since the discharge valve 65 is opened in the meantime, the gas in the space S is driven out and replaced by inert gas, and inert gas including chlorosilane gas is delivered to a scrubber 70 from the discharge pipe 64.

If the inside of the space S is replaced by inert gas, as shown in FIG. 4B, the discharge valve 65 is sealed while continuing the injection of the inert gas, thereby increasing the pressure in the space S. When the pressure inside of the space S has become higher than the pressure inside of the tank 11, as shown in FIG. 4C, the supply valve 63 is sealed.

Since the inside of the space S is filled with inert gas and the inside of the space S is given positive pressure relative to the inside of the tank 11, the liquid chlorosilane L is prevented from leaking into the space S through the valve body 44 from the tank 11, and air from the outside is prevented from leaking into the space S via between the valve body and the lid body 61 of the closing lid 60. Accordingly, generation of corrosive gas, silica, etc. is prevented and deterioration of the sealing performance of the ball valve 40 can be prevented.

Further, if the closing lid 60 is detached after the space S of the valve 40 is purged with inert gas by using the closing lid 60 when the liquid chlorosilane L is extracted from the storage container 10, risks caused by the rapid reaction between chlorosilane gas and air can also be reduced.

In addition, the present invention is not limited to the configuration of the above embodiment, but in the detailed configuration, various modifications can be made without departing from the spirit and scope of the present invention. For example, the closing lid 60 connected to the valve 40 may be connected to at least the valve 40B on the liquid extraction side. However, corrosion or the like in the valve 40A can also be prevented by connecting the closing lid 60 to the valve 40A on the inert gas supply side.

Further, although inert gas, such as argon gas, is supplied from the inert gas supply tool, nitrogen gas may be used instead of argon gas or the like, and nitrogen is included as an inert gas in the present invention.

In addition, in the above embodiment, the tank 11 of the storage container 10 is provided with the ball valve 40. However, a valve mechanism other than a ball valve may be adopted. Further, the valve mechanism of the supply valve 63 and the discharge valve 65 is also not particularly limited.

Further, stainless steel, such as SUS304 or SUS316, is used as the material of the tank 11 or the lid body 61. Although the same kind of stainless steel is used as the material of the valve 40 and piping, carbon steel or the like can be used depending on constituent parts.

What is claimed is:

1. A storage container for a liquid chlorosilane, comprising:
    a tank which stores the liquid chlorosilane;
    a valve which is connected to the tank and to which an external pipe can be connected detachably; and
    a closing lid which seals the valve when the external pipe is detached from the valve,
    wherein the valve comprises a housing and a valve body provided in the housing, the housing has a connecting flange having a connecting surface to be connected detachably to the external pipe, and
    the closing lid has a lid body having a sealing surface contacting the connecting surface of the connecting flange, a supply pipe which supplies an inert gas to a space between the closing lid and the valve body in the housing, a supply valve which opens or closes the supply pipe, a discharge pipe which discharges a gas in the space, and a discharge valve which opens or closes the discharge pipe.

2. The storage container for a liquid chlorosilane according to claim 1, further comprising a gasket sandwiched between the connecting surface of the housing and the sealing surface of the lid body, and at least one of the connecting surface and the sealing surface has at least one groove formed thereon.

3. A closing lid for a liquid chlorosilane storage container connected detachably to a connecting flange of a valve fixed to a tank which stores the liquid chlorosilane, comprising:
    a lid body having a sealing surface contacting a connecting surface of the connecting flange;
    a supply pipe which supplies an inert gas to a space between the closing lid and a valve body of the valve;
    a supply valve which opens or closes the supply pipe;
    a discharge pipe which discharges a gas in the space; and
    a discharge valve which opens or closes the discharge pipe,
    wherein the closing lid is fixed to the connecting flange to seal the space.

* * * * *